United States Patent Office 2,986,730
Patented May 30, 1961

2,986,730

PULSE-ECHO DISTANCE INDICATOR

John T. McLamore, Haddonfield, and Robert Trachtenberg, Camden, N.J., assignors, by mesne assignments, to the United States of America as represented by the Secretary of the Navy Filed Aug. 5, 1952, Ser. No. 302,654

4 Claims. (Cl. 343—13)

The present invention relates to radio pulse-echo systems and particularly to systems that include a goniometer-type phase shifter and a zero-center meter, which cooperate to permit absolute altitude measurements and observation of rapid changes in altitude.

Radio pulse-echo systems, which are utilized to determine distance or altitude by measuring the time required for a radio pulse to travel from a transmitter to a reflecting object and back to a receiver located near the transmitter, are well-known. This time interval is commonly measured by means of a cathode-ray indicator tube, which is calibrated to read distance directly. For some applications it is desirable to have a metering system that permits observation of rapid changes in altitude.

An object of the present invention is to provide in a pulse-echo distance measuring system an improved method of and means for indicating the absolute distance on a calibrated dial and error meter.

A further object of the present invention is to provide a metering system that permits observation of rapid changes in altitude.

In one preferred embodiment of the present invention a sine wave is generated by a stable oscillator. This radio-frequency pulse is transmitted once per cycle and at a fixed time with respect to the instant the sine wave goes through zero in a given direction. The pulse is reflected by a reflecting object, received, amplified and detected. A sine-wave voltage from the stable oscillator is passed through a calibrated phase-shifting device. The relationship between the received pulse and phase-shifted sine wave are detected and indicated by utilization of a phase detector, amplifier and meter. A zero-center meter is used to indicate zero when the received pulse occurs at the instant the phase-shifted sine wave goes through zero and distance (range) can then be read from the calibrated phase-shifting device. The zero-center meter is calibrated in feet (plus or minus) and the reading indicated thereon is added algebraically to the calibrated reading of phase-shifting device.

The present invention will be better understood from the following description taken in connection with the accompanying drawings in which.

Figure 1:
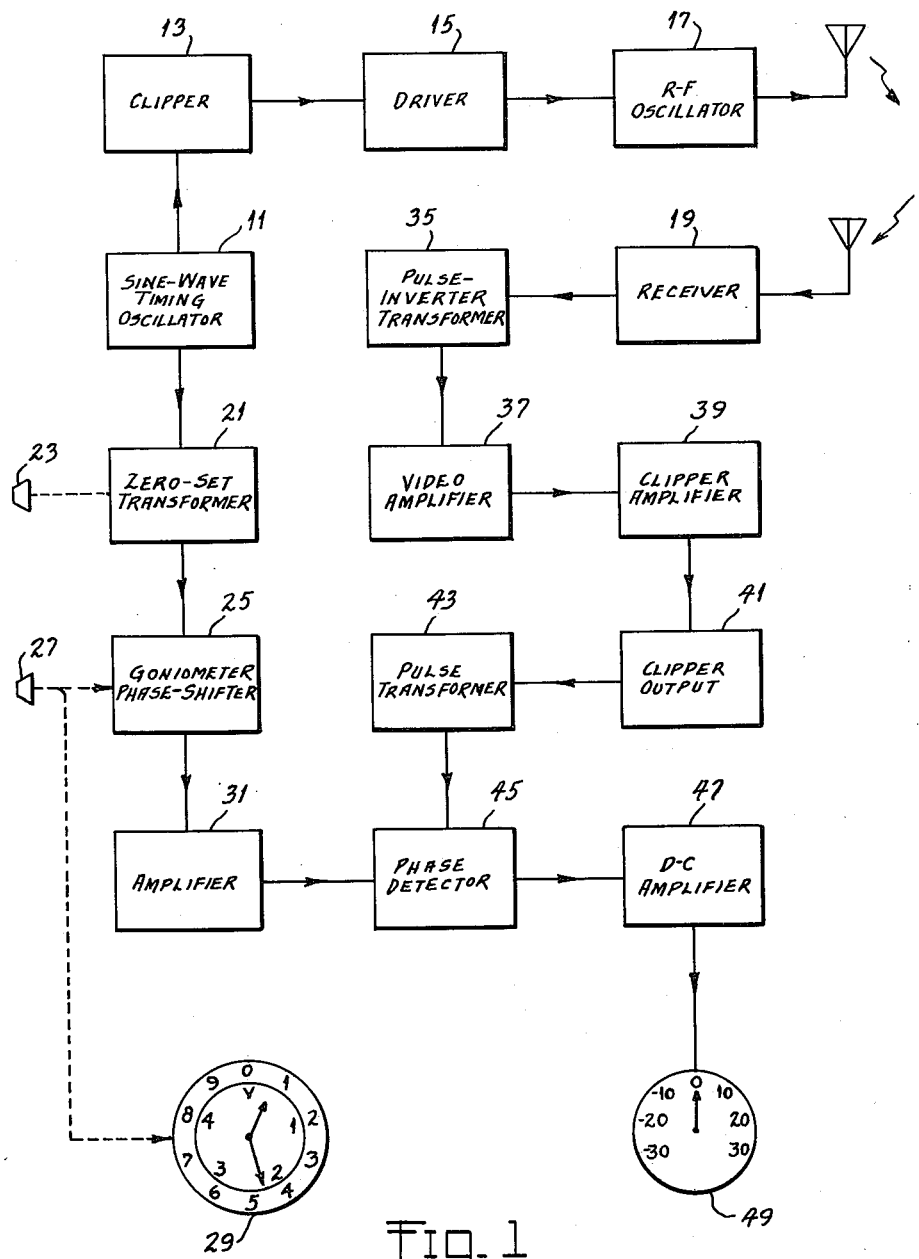
Fig. 1 is a block diagram of one embodiment of the invention.

In Fig. 1, the pulse transmitter of the system comprises a sine-wave timing oscillator 11, which is crystal controlled and which supplies a sine-wave signal to a clipper circuit 13, which reshapes the signal and supplies the reshaped signal to a driver stage 15. Said driver stage produces a damped voltage train signal, which fires the R-F oscillator 17 into transmission. The resulting pulses of radio energy from said R-F oscillator stage are radiated to earth or to some other reflecting surface or object.

The reflected or echo pulses are received and are demodulated in a radio receiver 19. Said echo pulses are positive in nature and are fed into a transformer 35, which inverts the positive pulses and supplies said inverted or negative pulses to a video amplifier circuit 37. The positive pulses obtained from the output of said video amplifier are supplied to a clipper-amplifier 39, which amplifies said pulses and produces very narrow pulses by means of a tuned-network, which is not shown. Said tuned network is resonant at approximately nine times the repetition rate of said echo pulses and produces a voltage train with each positive pulse applied to the grid of said clipper-amplifier. The sharp positive peak of the first pulse in this voltage train overcomes the grid bias on the clipper output circuit 41 and said clipper output circuit supplies a sharp pulse of current of proper level to the primary of the pulse transformer 43 which in turn supplies a pulse input signal to the phase-detecting circuit 45.

A sine-wave voltage, which is supplied from the crystal-controlled timing oscillator circuit 11, is fed to a primary zero-set transformer 21. The secondary of said transformer has an adjustable core, the position of which is controlled by calibrate-adjust knob 23. Said calibrate-adjust knob shifts the phase of said sine-wave voltage. Said sine-wave voltage is then fed to a filter circuit not shown, which is tuned to receive said sine-wave voltage, and then to a goniometer phase-shifting transformer 25, consisting of two fixed primary windings connected in series, and one movable secondary winding, which is mechanically coupled to the altitude-adjust knob 27. Said altitude-adjust knob controls the relative position of the movable coil in said goniometer transformer as indicated on a goniometer dial 29. Said goniometer phase-shifter is calibrated in feet. In said goniometer phase-shifter the sine-wave voltage is split into two signals of equal amplitude separated by 90° phase shift in said primary windings. The phase of the resultant signal induced in said movable secondary winding is determined by the angular position of the secondary winding with respect to the primary winding, and can be shifted through 360 degrees by rotating the altitude-adjust knob.

The phase of the above-mentioned sine-wave voltage is adjusted and passed through said goniometer phase-shifter and supplied to a tuned two-stage amplifier circuit 31 and amplified.

Said amplified sine-wave signal and said received pulse input signal are together impressed on a phase-detector circuit 45. The phase difference of said received pulse from said amplified sine-wave signal is detected as a differential voltage. Said differential voltage is amplified by an amplifier 47 and then supplied to a calibrated meter 49, which indicates feet variation of altitude. By adjusting the angular position of the movable coil of said goniometer transformer 25, said sine-wave voltage is shifted in phase so that the zero reference level coincides in time with said received pulse. Said calibrated meter will then indicate zero and the goniometer dial 29 will read the absolute altitude.

Figure 2:
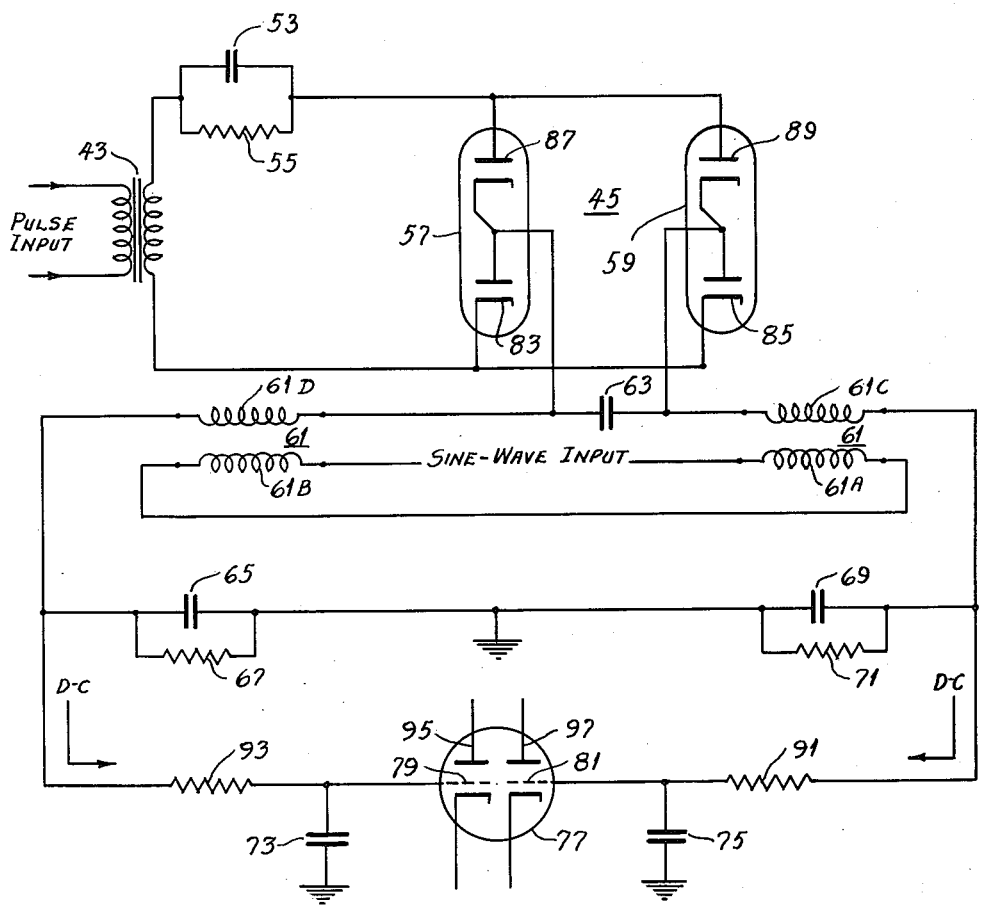
Fig. 2 is a schematic diagram of the phase-detecting circuit of the invention.

In Fig. 2, the amplified sine-wave signal supplied by said two-stage amplifier circuit 31 is fed into the primary windings 61A and 61B of transformer 61 and transformer-coupled into the two tuned secondary windings 61C and 61D of said transformer 61. Upon the arrival of a pulse input signal causing conduction of phase-detecting tubes 57 and 59 said secondary windings are effectively connected across capacitors 69 and 65 respectively and charge the capacitors to the instantaneous value of said amplified sine-wave voltage. The voltage developed across said capacitors serves to provide the D.-C. control bias supplied to the grids 79 and 81 of the amplifier 47 from the ungrounded sides of said capacitors.

The pulse input signal from said clipper output is supplied to the transformer 43 and is impressed on the cathodes 83 and 85 of the dual-diode phase-detecting tubes 57 and 59 in negative polarity, and upon the plates 87 and 89 of said phase-detecting tubes in positive polarity. The capacitor 53 and resistor 55 combination in the plate circuit of said phase-detecting tubes, prevents conduction of said tubes at all times except during the instance of pulse-input signal. When said tubes are conducting they effectively short-circuit the sine-wave input tuning capacitors 63, thereby placing the capacitors 65 and 69 across the secondary windings 61D and 61C respectively. Said capacitors will then be charged to the instantaneous voltage value of the sine-wave input signal present in said secondary windings. The discharge rate of said capacitors is very slow compared to the charging pulse repetition-rate, so that said capacitors remain charged, at levels determined by the instantaneous value of the sine-wave input voltage when tubes 57 and 59 are conducting whereby direct-current control voltages are developed across the capacitors 65 and 69 and are applied to the grids 79 and 81 of the twin-triode amplifier tube 77.

The D.-C. control voltage developed across capacitor 69 is applied to grid 81 of tube 77 through the resistance-capacitance filter circuit composed of resistor 91 and capacitor 75. In like manner, the D.-C. control voltage in opposite polarity developed across capacitor 65 is applied to grid 79 of tube 77 through the resistance-capacitance filter circuit composed of resistor 93 and capacitor 73. Said control signals applied to grids 79 and 81 are amplified, and set up a voltage difference between the plates 95 and 97 of tube 77. This causes a direct current to flow from said amplifier to the zero-center meter 49. Said current is proportional to the voltage difference between the voltages developed across the ungrounded sides of capacitors 65 and 69, which in turn are dependent on the phase relationship between the input pulses and sine-wave voltages. Said meter indicates the altitude variation from the goniometer dial indication. The algebraic sum of the goniometer dial and meter readings is always the true altitude indication.

From the foregoing it will be seen that one of the important features of this invention is that rapid changes in altitude can be read from the zero-center meter 49. Such readings of said zero-center meter added algebraically to the reading of the calibrated goniometer phase-shifter dial 29 yield the absolute distance from the reflecting surface or object.

While one specific goniometer phase-shifter and one specific phase-detecting circuit has been described it should be understood that the invention is not limited to the use of these particular circuits. It should be further understood that other modifications can be made in the invention if desired. For example, the phase-shifted sine wave can be modified into a symmetrical square wave by passing said phase-shifted wave into a suitable amplifying and peak-clipping circuit for operation of the phase detector to obtain greater sensitivity with a given peak-to-peak amplitude. The squaring function may be accomplished in the embodiment of Fig. 1 by biasing amplifier 31 so that it operates as a conventional overdriven amplifier.

What is claimed:

1. A pulse-echo system comprising means for transmitting pulses of energy to a reflecting object, a receiver for receiving said pulses after reflection from said object, means for amplifying and reshaping said pulses, a phase-detecting circuit, means for applying said amplified pulses to said phase-detecting circuit, means for obtaining a phase-reference voltage of sine-wave form from said transmitting means, calibrated goniometer phase-shifting means for shifting the phase of said reference voltage and said amplified pulse with respect to each other, means for applying said amplified pulse and phase-shifted reference voltage to said phase-detecting circuit, whereby the differential output thereof varies in accordance with the phase relation of the two voltages applied thereto, an amplifier, means for applying said output to said amplifier, a zero-center meter which is electrically coupled to said amplifier, and means for applying said amplified output to said zero-center meter whereby the algebraic sum of the readings of said calibrated phase-shifting means and said zero-center meter is an instantaneous measure of absolute altitude.

2. A pulse-echo system comprising means for transmitting pulses of energy to a reflecting object, a receiver for receiving said pulses after reflection from said object, means for amplifying and reshaping said pulse, a phase-detecting circuit, means for applying said amplified pulses to said phase-detecting circuit, means for obtaining a phase reference voltage of sine-wave form from said transmitting means, calibrated goniometer phase-shifting means for shifting the phase of said reference voltage and said amplified pulse with respect to each other, means for converting said phase-shifted sine-wave reference voltage into a symmetrical square wave, means for applying said amplified pulse and said symmetrical square wave to said phase-detecting circuit, whereby the differential output thereof varies in accordance with the phase relation of the two voltages applied thereto, an amplifier, means for applying said output to said amplifier, a zero-center meter which is electrically coupled to said amplifier, and means for applying said amplified output to said zero-center meter whereby the algebraic sum of the readings of said calibrated phase-shifting means and said zero-center meter is an instantaneous measure of absolute altitude.

3. In a pulse echo system including means for generating and radiating electromagnetic energy in pulse form and means for receiving the reflected energy in the form of echo pulses, means providing repetitive reference signals from which said radiated pulses derive their phasing, calibrated means for shifting the phase of said reference signals, means for comparing the phase of each echo pulse with the phase of that reference signal from which said echo pulse was derived and for detecting the differential signal resulting from said comparison, and calibrated means for measuring the differential signal and instantaneously indicating the phase difference in terms of distance.

4. In a pulse echo system including means for generating and radiating electromagnetic energy in pulse form and means for receiving the reflected energy in the form of echo pulses, means providing repetitive reference signals from which said radiated pulses derive their phasing, calibrated goniometer means for shifting the phase of said reference signals, means for comparing the phase of each echo pulse with the phase of that reference signal from which said echo pulse was derived and for detecting the differential signal resulting from said comparison, and calibrated means for measuring the differential signal and instantaneously indicating the phase difference in terms of distance.

References Cited in the file of this patent

UNITED STATES PATENTS

| | | |
|---|---|---|
| 2,268,643 | Crosby | Jan. 6, 1942 |
| 2,407,198 | Wolff | Sept. 3, 1946 |
| 2,422,074 | Bond | June 10, 1947 |
| 2,520,489 | Bergmar et al. | Aug. 29, 1950 |
| 2,537,574 | Crosby | Jan. 9, 1951 |
| 2,540,827 | Mankin | Feb. 6, 1951 |
| 2,713,160 | Trachtenberg | July 12, 1955 |
| 2,716,233 | Westwood | Aug. 23, 1955 |